(12) United States Patent
Clark et al.

(10) Patent No.: US 11,790,274 B2
(45) Date of Patent: *Oct. 17, 2023

(54) TRAINING NEURAL NETWORKS TO GENERATE STRUCTURED EMBEDDINGS

(71) Applicant: Google LLC, Mountain View, CA (US)

(72) Inventors: Robert Andrew James Clark, Hertfordshire (GB); Chun-an Chan, Mountain View, CA (US); Vincent Ping Leung Wan, London (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,995

(22) Filed: Oct. 26, 2022

(65) Prior Publication Data

US 2023/0060886 A1    Mar. 2, 2023

Related U.S. Application Data

(63) Continuation of application No. 16/586,223, filed on Sep. 27, 2019, now Pat. No. 11,494,695.

(51) Int. Cl.
*G06N 20/00* (2019.01)
*G06N 3/084* (2023.01)
*G06N 3/045* (2023.01)

(52) U.S. Cl.
CPC ............ *G06N 20/00* (2019.01); *G06N 3/045* (2023.01); *G06N 3/084* (2013.01)

(58) Field of Classification Search
CPC ......... G06N 20/00; G06N 3/045; G06N 3/084
See application file for complete search history.

(56) References Cited

U.S. PATENT DOCUMENTS 10,152,676 B1 * 12/2018 Strom .................... G06N 3/084
10,373,055 B1    8/2019 Matthey-de-l'Endriot et al.
(Continued)

FOREIGN PATENT DOCUMENTS

EP      337697        10/1989
EP      337697 A2     10/1989

OTHER PUBLICATIONS

International Search Report and Written Opinion for PCT Application No. PCT/US2020/052649, dated Sep. 25, 2020, 80 pages.
(Continued)

*Primary Examiner* — Brian M Smith
*Assistant Examiner* — Michael H Hoang
(74) *Attorney, Agent, or Firm* — Honigman LLP; Brett A. Krueger; Grant J. Griffith (57) ABSTRACT

Methods, systems, and apparatus, including computer programs encoded on a computer storage medium, for training a machine learning model to generate embeddings of inputs to the machine learning model, the machine learning model having an encoder that generates the embeddings from the inputs and a decoder that generates outputs from the generated embeddings, wherein the embedding is partitioned into a sequence of embedding partitions that each includes one or more dimensions of the embedding, the operations comprising: for a first embedding partition in the sequence of embedding partitions: performing initial training to train the encoder and a decoder replica corresponding to the first embedding partition; for each particular embedding partition that is after the first embedding partition in the sequence of embedding partitions: performing incremental training to train the encoder and a decoder replica corresponding to the particular partition.

20 Claims, 5 Drawing Sheets

(56) References Cited

U.S. PATENT DOCUMENTS

| | | |
|---|---|---|
| 2011/0208444 A1 | 8/2011 | Solinsky |
| 2017/0039485 A1 | 2/2017 | Kadav |
| 2017/0046971 A1 | 2/2017 | Moreno |
| 2017/0230675 A1 | 8/2017 | Wierstra |
| 2017/0345140 A1 | 11/2017 | Zhang |
| 2017/0351952 A1 | 12/2017 | Zhang |
| 2017/0365038 A1 | 12/2017 | Denton |
| 2017/0371017 A1 | 12/2017 | Odry |
| 2018/0247200 A1 | 8/2018 | Rolfe |
| 2019/0018933 A1 | 1/2019 | Oono |
| 2020/0134463 A1 | 4/2020 | Haidar |

OTHER PUBLICATIONS

Sa\l1 ID Ladjal et al: 11 A PCA-like Autoencoder, arxiv.org, Cornell University Library, 201 Olin Library Cornell Universi ty Ithaca, NY 14853, Apr. 2, 2019 (Apr. 2, 2019), XP081163759, abstract, chapters 1 Introducti on—3 PCA Autoencoder; p. 1-p. 5; figure 1, chapters 4.1 Future Work—5 Concl usi on; p. 8, 1 page.

Jaeyoung Yoo et al: 11 Density Estimation and Incremental Learning of Latent Vector for Generative Autoencoders, arxiv.org, Cornell University Library, 201 Olin Library Cornell University Ithaca, NY 14853, Feb. 12, 2019 (Feb. 12, 2019), XP881028885, abstract chapters 1. Introduction—3. Autoencoder with Latent Density Estimator; p. 1-p. 5; figures 1-4 Chapter 5. Conclusion; p. 8, 1 page.

Yang Carl et al: 11 Meta-Graph Based HIN Spectral Embedding: Methods, Analyses, and Insights11 , 2818 IEEE International Conference on Data Mining (ICDM), IEEE, Nov. 17, 2018 (Nov. 17, 2018), pp. 657-666, XP033485688, DOI: 18.1109/ICDM.2018.00081[retri eved on Dec. 27, 2018] abstract chapter I II. Meta-Graph Based HIN Spectral Embedding;figure 1, 9 pages.

Yao, Q., Liao, X., & Jin, H. (Oct. 2015). A map-reduce method for training autoencoders on xeon phi. In 2015 IEEE International Conference on Computer and Information Technology; Ubiquitous Computing and Communications; Dependable, Autonomic and Secure Computing; IEEE, 2015. (Year: 2015). <https://ieeexplore.ieee.org/stannp/stannp.jsp?tp=&arnunnber=7363241.

Wang, Yuxuan, et al. "Tacotron: Towards end-to-end speech synthesis." arXiv preprint arXiv:1703.10135 (2017). https://arxiv.org/abs/1703.10135 (Year: 2017).

Choi, Euntae, Kyungmi Lee, and Kiyoung Choi. "Autoencoder-based incremental class learning without retraining on old data." arXiv preprint arXiv:1907.07872 (2019). <https://arxiv.org/abs/1907.07872> (Year: 2019).

Lample, Guillaume, et al. "Fader networks: Manipulating images by sliding attributes." arXiv preprint arXiv:1706.00409 (2017). https://arxiv.org/pdf/1706.00409.pdf <http://arxiv.org/pdf/1706.00409.pdf> (Year: 2017).

'www.cs.nyu.edu' [online] "Data for MATLAB hackers," Sam Rowels, Date: Unknown, [retrieved on Jun. 21, 2017] Retrieved from Internet: URL<<http://www.cs.nyu.edut-roweis/data.html>> 3 pages.

Aubry et al. "Seeing 3d chairs: exemplar part-based 2d-3d alignment using a large dataset of cad models," CVPR, 2014, 8 pages.

Barlow et al. "Finding minimal entropy codes," Neural Computations 1.3, 1989, 12 pages.

Bengio et al. "Representation learning: a review and new perspectives," arXiv preprint arXiv1206.5538v3, Apr. 23, 2014, 30 pages.

Candy et al. "Retinal image quality and postnatal visual experience during infancy," Optom Vis Sci, 86(6) 2009.

Cheung et al. "Discovering hidden factors of variation in deep networks," arXiv preprint arXiv1412.6583v4, Jun. 17, 2015, 10 pages.

Cohen et al. "Learning the irreducible representations of commutative lie groups," ICML, Feb. 18, 2014, 9 pages.

Cohen et al. "Transformation properties of learned visual representations," arXiv preprint arXiv 1412.7659v3 Apr. 7, 2015, 11 pages.

Desjardins et al. "Disentangling factors of variation via generative entangling," arXiv preprint arXiv1210.5474v1 Oct. 19, 2012, 10 pages.

Doersch. "Tutorial on Variational Autoencoders," arXiv preprint arXiv 1606.05908v2, Aug. 13, 2016, 23 pages.

Duchi et al. "Adaptive subgradient methods for online learning and stochastic optimization," Journal of Machine Learning Research, Jul. 12, 2011, 39 pages.

Goroshin et al. "Learning to linearize under uncertainty," NIPS 2015, 9 pages.

Gross et al. "Multi-pie," Image and Vision Computing, 28(5) May 31, 2010, 8 pages.

Higgins et al "Early Visual Concept Learning with Unsupervised Deep Learning," arXiv preprint arXiv1606.05579v1, Jun. 17, 2016, 12 pages.

Yang et al. "Weakly-supervised disentangling with recurrent transformation for 3d view synthesis," NIPS, 2015, 9 pages.

Zhu et al. "Multi-view perceptron: a deep model for learning face identity and view representations," Advances in Neural Information Processing Systems, 27, 2014, 9 pages.

Higgins et al. "The roles of independent motion in object segmentation in the ventral visual stream: Learning to recognize the separate parts of the body," Vision Research, 51.6, Mar. 25, 2011, 10 pages.

Hinton et al. "Transforming auto-encoders," International Conference on Artificial Neural Networks, 2011, 8 pages.

Karaletsos et al. "Bayesian representation learning with oracle constraints," arXiv preprint arXiv1506.05011v4, Mar. 1, 2016, 16 pages.

Kingma et al. "Adam: A method for stochastic optimization," arXiv preprint arXiv1412.6980v9, Jan. 30, 2017, 15 pages.

Kingma et al. "Auto-encoding variational bayes," arXiv preprint arXiv1312.6114v10, May 1, 2014, 14 pages.

Kulkarni et al. "Deep convolutional inverse graphics network," NIPS 2015, 9 pages.

Lake et al. "Building machines that learn and think like people," arXiv preprint arXiv1604.00289v3, Nov. 2, 2016, 58 pages.

Leat et al. "Development of visual acuity and contrast sensitivity in children," Journal of Optometry 2(1), Dec. 31, 2009, 8 pages.

Mnih et al. "Human-level control through deep reinforcement learning," Nature 518(7540) Feb. 26, 2015, 13 pages.

Perry et al. "Continuous transformation learning of translation invariant representations," Experimental Brain Research 204.2, Jul. 1, 2010, 16 pages.

Reed et al. "Learning to disentangle factors of variation with manifold interaction," ICML, 2014, 9 pages.

Rezende et al. "Stochastic backpropagation and approximate inference in deep generative models," arXiv preprint arXiv1401.4082v3, May 30, 2014, 14 pages.

Rippel et al. "High-dimensional probability estimation with deep density models," arXiv preprint ar Xiv 1302.5125v1, Feb. 20, 2013, 12 pages.

Schmidhuber. "Learning factorial codes by predictability minimization," Neural Computation 4(6), Nov. 4, 1992, 11 pages.

Tang et al. "Tensor analyzers," Proceedings of the 30th International Conference on Machine Learning, Feb. 13, 2013, 9 pages.

Vasilescu et al. "Multilinear independent components analysis," CVPR 1, Jun. 20, 2005.

Whitney et al. "Understanding visual concepts with continuation learning," arXiv preprint arXiv1602.06822v1, Feb. 22, 2016, 4 pages.

USPTO. Office Action relating to U.S. Appl. No. 16/586,223, dated Oct. 18, 2021.

Yao, Q., Liao, X., & Jin, H. (Oct. 2015). A map-reduce method for training autoencoders on xeon phi. In 2015 EEE International Conference on Computer and Information Technology; Ubiquitous Computing and Communications; Dependable, Autonomic and Secure Computing; IEEE, 2015. (Year: 2015). <https://ieeexplore.ieee.org/stannp/stannp.isp?tp=&arnunnber=7363241 >.

Higgins et al, "B-Vae: Learning Basic Visual Concepts with a Constrained Variational Framework," ICLR 2017, 13 pages.

* cited by examiner

TRAINING NEURAL NETWORKS TO GENERATE STRUCTURED EMBEDDINGS

CROSS REFERENCE TO RELATED APPLICATION

This U.S. patent application is a continuation of, and claims priority under 35 U.S.C. § 120 from, U.S. patent application Ser. No. 16/586,223, filed on Sep. 27, 2019. The disclosure of this prior application is considered part of the disclosure of this application and is hereby incorporated herein by reference in its entirety.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies relating to training an encoder-decoder engine to generate structured embeddings that can later on be modified in an intuitive way.

In general, one innovative aspect of the subject matter described in this specification can be embodied in methods performed by one or more computers for training a machine learning model to generate embeddings of inputs to the machine learning model, the machine learning model having an encoder that generates the embeddings from the inputs and a decoder that generates outputs from the generated embeddings, wherein the embedding is partitioned into a sequence of embedding partitions that each includes one or more dimensions of the embedding, the method including: for a first embedding partition in the sequence of embedding partitions: performing initial training to train the encoder and a decoder replica corresponding to the first embedding partition, wherein during the initial training the decoder replica receives as input first masked embedding, the first masked embedding including (i) values generated by the encoder for the first embedding partition, and (ii) masked out values for all subsequent embedding partitions in the sequence; for each particular embedding partition that is after the first embedding partition in the sequence of embedding partitions: performing incremental training to train the encoder and a decoder replica corresponding to the particular partition, wherein during the incremental training the decoder replica corresponding to the particular partition receives as input incrementally masked embedding for the particular partition, the incrementally masked embedding including (i) values generated by the encoder for the particular embedding partition and each embedding partition that precedes the particular embedding partition in the sequence, and (ii) masked out values for any subsequent embedding partitions that are after the particular embedding partition in the sequence. Other embodiments of this aspect include corresponding systems, apparatus, and computer programs, configured to perform the actions of the methods, encoded on computer storage devices.

In some implementations, performing incremental training further includes, for each preceding embedding partition that precedes the particular embedding partition in the sequence: training the encoder and a decoder replica corresponding to the preceding embedding partition, wherein during the incremental training the decoder replica receives as input incrementally masked embedding for the preceding partition.

In some implementations, during the incremental training, parameters of the decoder replicas corresponding to the particular partition and the preceding partitions are constrained to have the same values. In some implementations, performing initial training to train the encoder and a decoder replica corresponding to the first embedding partition includes: determining a gradient of an objective function with respect to an output generated by the decoder replica; backpropagating the gradient from the decoder replica only to a corresponding portion of the encoder that generates the first embedding partition; and updating, using the backpropagated gradient, respective parameter values of the decoder replica and the corresponding portion of the encoder.

In some implementations, performing incremental training to train the encoder and a decoder replica corresponding to the particular partition includes: determining a gradient of an objective function with respect to an output generated by the decoder replica; backpropagating the gradient from the decoder replica only to a corresponding portion of the encoder that generates the particular embedding partition; and updating, using the backpropagated gradient, respective parameter values of the decoder replica and the corresponding portion of the encoder.

In some implementations, the method further includes: determining that the gradient of the objective function has converged to a predetermined value; and in response to the determining, terminating the initial training and beginning the incremental training for the second partition in the sequence.

In some implementations, the masked out values for all subsequent embedding partitions in the sequence are zero.

In some implementations, the encoder applies an activation function having a fixed output range to an intermediate encoder output to generate the embedding.

In some implementations, the inputs are units of text, and the outputs are utterances representing the units of text.

In some implementations, the method further includes: after performing all incremental trainings: receiving a new input; processing the new input using the trained encoder to generate an initial embedding for the new input; receiving a user input modifying values of a given embedding partition in the initial embedding to generate a new embedding; and processing the new embedding using the trained decoder to generate an output for the new embedding.

Particular embodiments of the subject matter described in this specification can be implemented so as to realize one or more of the following advantages. Typically, an encoder-decoder engine includes an encoder and a decoder which are both implemented as machine learning models, e.g., neural networks. The engine can be configured to perform a machine learning task by encoding a received input into an embedding that includes an ordered collection of numeric values and then decoding the embedding to generate an output. Following conventional training techniques, the embedding representation is typically entangled, e.g., a single numeric value included in the embedding may represent multiple output features. In practice, having an entangled embedding representation has several issues. One issue is that it increases optimization difficulties which further results in prolonged training processes. Another issue is that an entangled representation reduces overall interpretability of the embedding to human users and inhibits the embedding from being modified in a desired manner after generation. This specification, however, discloses a technique for training an encoder-decoder engine in a structured process. As a result of the structured training process, a generated embedding is a disentangled representation of the output. In particular, the embedding includes multiple partitions that each represent a different feature of the output. Further, a primary feature of the output is generally represented by the first embedding partition. Having the capability to generate an embedding that represents output features in such an interpretable manner enables human users to easily modify particular features of an output by adjusting corresponding numeric values within the embedding based on which the output is generated. Such capability in turn broadens the scope of the applications of encoder-decoder engines to include use cases in which fine-tuning of generated outputs is frequently required. For example, in text-to-speech applications, different human users might want certain input texts to be pronounced in particular manners which are different from the initially synthesized pronunciation.

The details of one or more embodiments of the subject matter described in this specification are set forth in the accompanying drawings and the description below. Other features, aspects, and advantages of the subject matter will become apparent from the description, the drawings, and the claims.

DESCRIPTION OF THE DRAWINGS

Like reference numbers and designations in the various drawings indicate like elements.

DETAILED DESCRIPTION

This specification describes a system implemented as computer programs on one or more computers in one or more locations that trains an encoder-decoder engine to generate structured embeddings that can later on be modified by a human user in an intuitive way.

Figure 1:
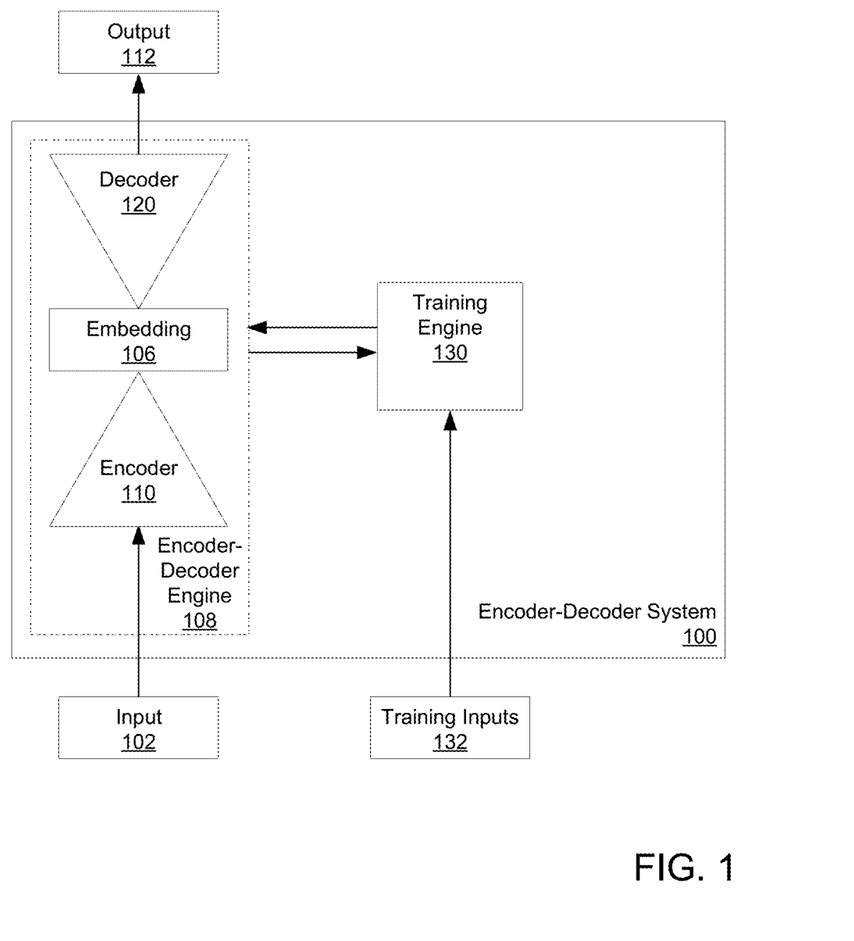
FIG. 1 is a block diagram of an example encoder-decoder system.

FIG. 1 is a block diagram of an example encoder-decoder system 100. The encoder-decoder system 100 is an example of a system implemented as computer programs on one or more computers in one or more locations, in which the systems, components, and techniques described below are implemented.

The encoder-decoder system 100 is configured to receive an input 102 and encode the input 102 into an embedding 106 that is in a lower dimensional space relative to the input 102. In other words, the embedding 106 is a numeric representation in a space that has a fixed dimensionality that is lower than the dimensionality of the input 102, i.e., the embedding 106 is an ordered collection of numeric values that has a fixed number of values. For example, the embedding 106 can be a vector or a matrix of fixed size.

The system 100 then decodes the embedding 106 to an output 112.

The system 100 performs the encoding and decoding processes using an encoder-decoder engine 108, which in turn includes an encoder 110 and a decoder 120.

In general, the system 100 can be configured to perform any of a range of machine learning tasks that involve either encoding, decoding, or both encoding and decoding processes. Depending on specific tasks, both the input 102 and the output 112 can be any of a variety of types of data and the input 102 and the output 112 may or may not be of the same type. In cases where the same type of data is included in both input 102 and output 112, the tasks performed by the encoder-decoder engine 108 can be referred to as autoencoding tasks.

For example, if the task is an image autoencoding task, the input 102 is structured data (e.g., an array) representing one image, and the output 112 generated by the engine 108 is data representing the reconstructed image.

As another example, if the task is an audio autoencoding task, the input 102 is data (e.g., waveform audio file) representing an audio, and the output 112 generated by the engine 108 is data representing the reconstructed audio. Example audios may include sound, speech, music, and so on.

In particular, both the encoder 110 and the decoder 120 are neural networks that can each include one or more neural network layers, e.g., fully-connected layers, convolutional layers, recurrent layers, activation layers, and so on. Each layer of the neural network generates an output from a received input in accordance with current values of a respective set of parameters. The outputs of preceding layers are used to construct the inputs of subsequent layers.

The encoder 110 is configured to receive the input 102 and process the input 102 in accordance with current encoder parameter values to generate an embedding 106 based on the input 102.

In some implementations, the encoder 110 applies a bounded activation function having a fixed output range to an intermediate encoder output (i.e., the output of a layer that precedes the activation layer) to generate the final embedding 106. In other words, the last layer of the encoder 110 is an activation layer that applies the activation function having a fixed output range to an intermediate encoder output generated by the layer preceding the activation layer in the encoder 110. Generally, an activation function transforms the distribution of an input to the function into a different distribution. A bounded activation function, for example, a tanh or a sigmoid function, forces the distribution of the generated embedding 106 to be predictable, i.e., within a fixed interval.

The decoder 120 is configured to receive the generated embedding 106 and process the embedding 106 in accordance with current decoder parameter values to generate the output 112.

The encoder-decoder system 100 also includes a training engine 130 that is configured to train the encoder-decoder engine 108 on training inputs 132. In particular, the training engine 130 trains the encoder 110 and decoder 120 using an iterative training process to determine trained values of the parameters of the encoder-decoder engine 108, including the set of encoder and decoder parameters.

Generally, the quality of training can be measured by an objective function that describes how well the trained encoder-decoder engine 108 can perform a given machine learning task. In particular, the objective function evaluates how close the generated outputs for given inputs are to desired, target outputs. Moreover, as described above, the output 112 is generated by the decoder 120 based on processing the embedding 106, which is in turn generated by the encoder 110 based on processing the received input 102. Therefore, the quality of training further determines how well the generated embedding 106 can represent distinctive features of the generated output 112.

In some implementations, the system 100 divides the embedding 106 into a sequence of embedding partitions. Each embedding partition includes one or more dimensions of numeric values. For example, if the embedding 106 is a 5-dimensional vector, i.e., a vector $[x_1, x_2, x_3, x_4, x_5]$ with 5 numeric values, the first dimension, i.e., the numeric value $x_1$, may be the first embedding partition in the sequence. Correspondingly, each subsequent dimension may be a subsequent embedding partition resulting in a total of five embedding partitions.

By training the encoder-decoder engine 108 appropriately using the structured training process that will be described in more detail below with reference to FIGS. 2-4, the system trains the encoder such that each given embedding partition represents the same corresponding feature of an output 112 for all generated outputs and each partition corresponds to a different feature from all other partitions. In other words, as a result of the training, a specific feature of an output 112 will be sensitive to changes in numeric values within one corresponding embedding partition and relatively invariant to changes in numeric values within other embedding partitions. Further, in some cases, the embedding partitions in the sequence represent different features of the output in an ordered manner. In such cases, the particular feature that is represented by the first embedding partition corresponds to a primary feature of the output. The primary feature corresponds to the feature that, during training, allows the engine 108 to minimize an error computed using the objective function that measures the quality of training. Optionally, the primary feature refers to the most representative characteristic of the output, e.g., identity of an object depicted in an image output, pitch of a voice recorded in a speech output, and the like. In some implementations, in a similar manner, the corresponding feature that is represented by the subsequent embedding partition in the sequence corresponds to a secondary feature of the output, i.e., the feature that allows the engine 108 to generate outputs with a second smallest error during training.

For instance, when used in text-to-speech tasks where input is tokenized data representing one or more units of text and output is a set of utterances (or waveforms of utterances) representing the units of text, a trained encoder-decoder engine 108 can be configured to generate a collection of embedding partitions can each represent different prosodic features of the output utterances corresponding to the input texts. Example prosodic features may include pitch, length, loudness, timbre, and so on. Thus, one partition can represent pitch, while another can represent length, and so on. Optionally, in cases where each embedding partition in turn includes more than one dimensions of numeric values, each dimension within one embedding partition can further represent a particular property of the corresponding prosodic feature, e.g., height, slope, or curvature of the pitch.

In some implementations, after being trained, the system 100 can be configured to receive a new input that is the same type of data as the training inputs. The system 100 processes the new input using the trained encoder to generate an initial embedding for the new input. The system then processes the initial embedding using the trained decoder to generate an initial output. As a result of the structured training process, the initial embedding includes multiple partitions that each represent a different feature of the output.

For example, if both the new input and training inputs are image data for an image reconstruction task, then each embedding partition can represent a particular graphic feature of the reconstructed images, e.g., scale, lighting, or color.

As another example, if both the new input and training inputs are text data for a text-to-speech task, then each embedding partition can represent a particular prosodic feature of utterances, e.g., pitch, duration, loudness, or timber.

In order to allow the features of the initial output to be modified after they have been generated, the system 100 can be further configured to receive a user input, e.g., through an application programming interface (API) provided by the system or through a user interface presentation generated by the system and displayed on a user device, that modifies values of one or more given embedding partitions in the initial embedding to generate a new embedding. The user input may specify modifications to the collection of numeric values within the one or more given embedding partitions. Upon receiving the user input, the system 100 processes the new embedding using the trained decoder to generate a modified output based on the new embedding. The modified output then incorporates the one or more modified features in its representation, e.g., modified color in the reconstructed image, rescaled pitch in the generated utterance, and so on.

As a particular example, in audio processing tasks, the system processes an input data representing an audio (e.g., a recording of user speech or a computer-generated speech sample) to generate an initial embedding. The system can be configured to receive a user input which specifies modifications to numeric values within one or more embedding partitions. The system then processes the modified embedding to generate a modified audio. The modified audio incorporates the one or more user-specified modifications to the corresponding features of the input audio.

On the other hand, if the training engine 130 has trained an encoder-decoder engine 108 in a conventional approach, i.e., not following the structured training process, a trained encoder 110 is likely to generate an entangled embedding 106, i.e., an embedding consisting of numeric values that each represent more than one features of an output 112, which is in turn generated by a trained decoder 120 based on processing the embedding 106. In other words, after being generated, modifications made to any one of the numeric values included in such embedding 106 would result in changes to more than one features in the output 112. In addition, while there exist other training techniques that aim at training the encoder 110 to generate a disentangled embedding 106, corresponding relations between different embedding dimensions and the features of the output 112 are difficult to identify. Specifically, if another disentangled embedding training technique is used, once the encoder-decoder engine has been trained, it would be hard to determine which embedding dimension corresponds to which feature because these techniques do not train the encoder-decoder engine in the structured and iterative manner described in this specification. Under these circumstances, fine-tuning a particular feature of the generated output in a desired manner would be difficult, and oftentimes, impractical.

Figure 2:
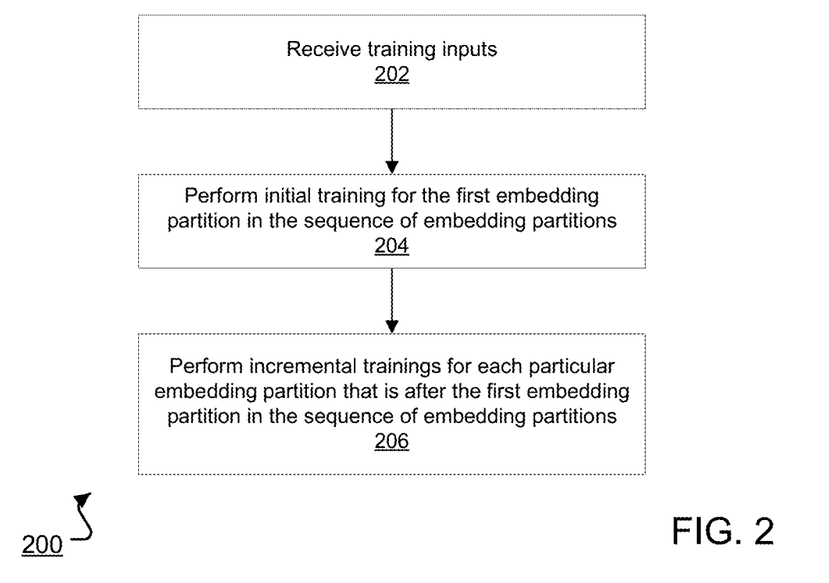
FIG. 2 is a flow diagram of an example process for training an encoder-decoder engine.

FIG. 2 is a flow diagram of an example process for training an encoder-decoder engine. For convenience, the process 200 will be described as being performed by a system of one or more computers located in one or more locations. For example, an encoder-decoder system, e.g., the encoder-decoder system 100 of FIG. 1, appropriately programmed in accordance with this specification, can perform the process 200.

The process 200 can be referred to as a structured training process. In brief, the structured training process includes an initial training process and one or more incremental training processes.

In some implementations, either before or while performing the process 200, the system generates one or more decoder replicas based on a decoder, i.e., the decoder 120 that is included in the encoder-decoder engine 108 as depicted in FIG. 1. The one or more decoder replicas are generated to have the same architecture and parameter values as the decoder. Thus, for convenience, the description below will only refer to decoder replicas, even in cases where the decoder is to be referred to.

In such implementations, the number of decoder replicas is typically the same as the number of partitions included in the embedding. That is, the system generates a corresponding decoder replica for each embedding partition.

Moreover, when performing the process 200, the system synchronously applies any changes made to parameter values of a particular decoder replica to all other decoder replicas. In this manner, the system constrains the parameter values of all decoder replicas to be the same.

The system receives training inputs (202). Each training input is associated with a target output. The target output is the output that should be generated by the engine by performing the machine learning task that the engine is configured to perform on the training input.

The system performs initial training for the first embedding partition in the sequence of embedding partitions (204). The first embedding partition includes the first one or more dimensions of numeric values from the embedding that is generated by the engine based on processing a received training input. In particular, instead of processing a full embedding, the system processes only the first embedding partition during initial training. That is, the system generates training outputs based only on the numeric values that are included in the first embedding partition. Accordingly, only such numeric values are updated at the end of each initial training iteration.

In general, performing initial training encourages the engine to learn to generate a first embedding partition that represents a primary feature of the training outputs. The primary feature refers to the most representative characteristic of the training output, e.g., identity of an object depicted in an image training output, pitch of a voice recorded in a speech training output, and the like. Even though not processing a full embedding, processing the first embedding partition that represents the primary feature of the training output allows the engine to generate a training output that is as close to a target output as possible, and therefore reduces an error computed using the objective function that measures the quality of training.

Performing initial training will be described in more detail below with reference to FIGS. 3A and 4A.

After the initial training has terminated (e.g., after a predetermined number of initial training iterations has been completed or after the computed gradient of the objective function has converged to a predetermined value), the system proceeds to perform incremental trainings.

The system performs incremental training for each particular embedding partition that is after the first embedding partition in the sequence of embedding partitions (206). In some implementations, the incremental trainings start from the second embedding partition in the sequence. The second embedding partition includes the one or more dimensions of numeric values that are subsequent to the first embedding partitions in the sequence. Similarly, each incremental training process terminates when certain termination criteria are satisfied, e.g., after a predetermined number of incremental training iterations has been completed or after the computed gradient of the objective function has converged to a predetermined value.

Performing incremental training encourages the engine to learn to generate embedding partitions that each represent a corresponding feature of a training output. Performing incremental training will be described in more details below with reference to FIGS. 3B and 4B.

Figure 3A:
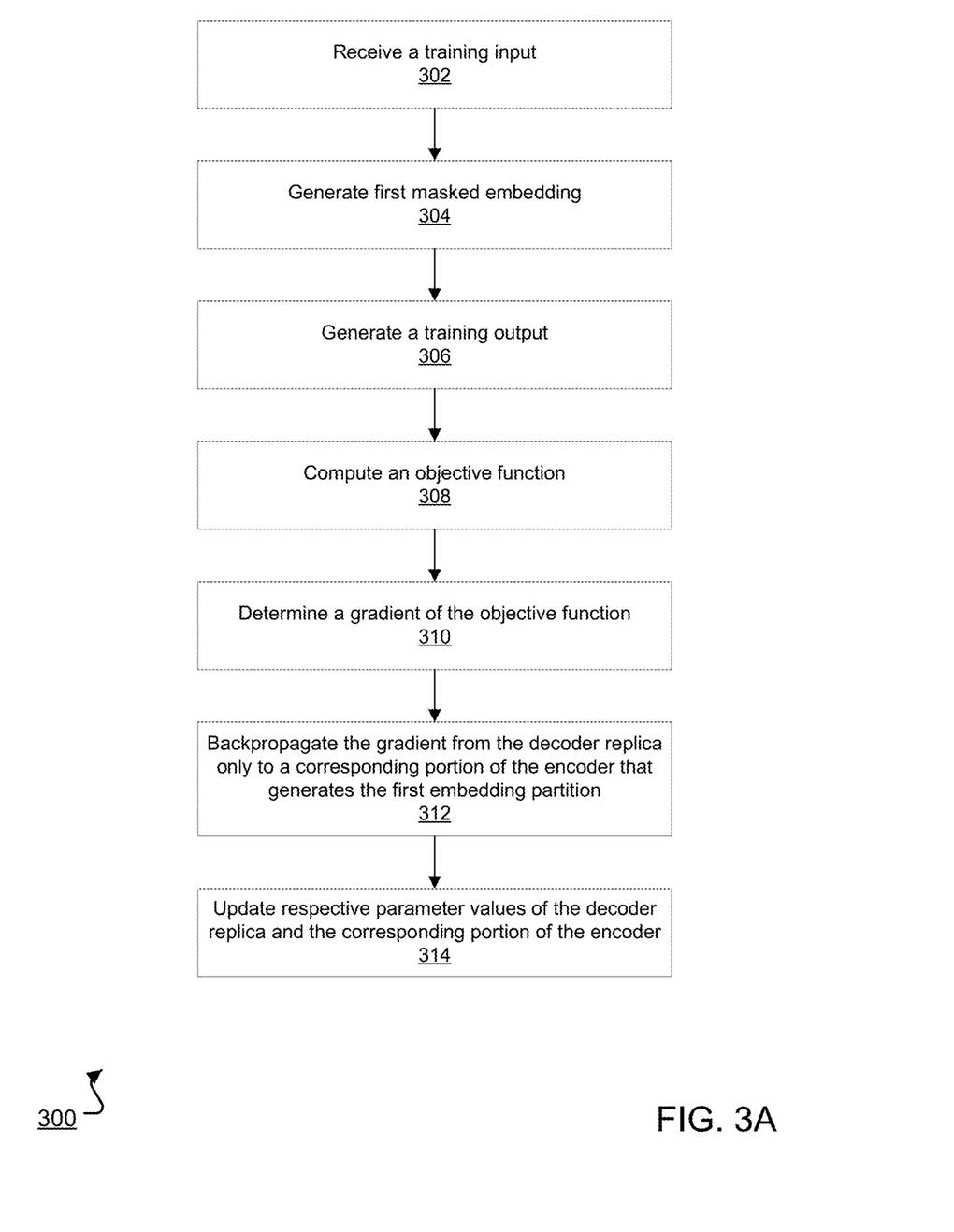
FIG. 3A is a flow diagram of an example process for performing initial training to train an encoder-decoder engine.

FIG. 3A is a flow diagram of an example process 300 for performing initial training to train an encoder-decoder engine. For convenience, the process 300A will be described as being performed by a system of one or more computers located in one or more locations. For example, an encoder-decoder system, e.g., the encoder-decoder system 100 of FIG. 1, appropriately programmed in accordance with this specification, can perform the process 300A.

The system can repeatedly perform the process 300 for different training inputs in order to perform the initial training, i.e., the training for the first embedding partition in the sequence.

The system receives a training input (302) that is associated with a target output. The target output is the output that should be generated by the system by performing the machine learning task that the system is configured to perform on the training input.

The system generates first masked embedding (304) based on processing the training input in accordance with current parameter values of the encoder. Specifically, the first masked embedding includes (i) values generated by the encoder for the first embedding partition, and (ii) masked out values for all subsequent embedding partitions in the sequence of embedding partitions. In some implementations, the system masks out values for all subsequent embedding partitions in the sequence by replacing these values with a predetermined value, e.g., zero.

Figure 4A:
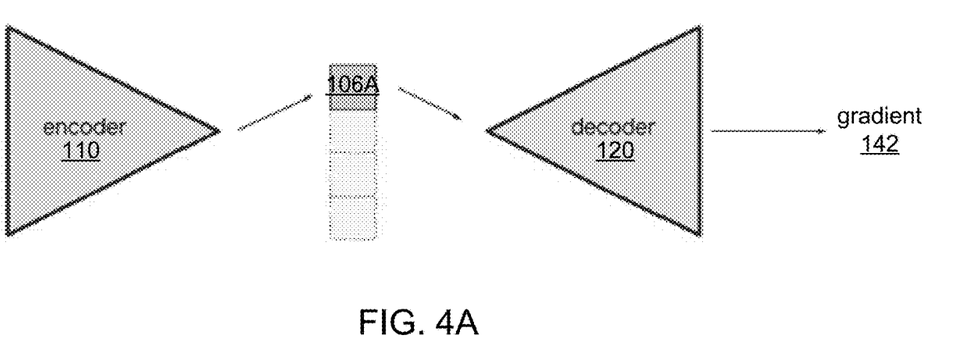
FIG. 4A is an illustration of an example of performing initial training for the first embedding partition to train an encoder-decoder engine.

Referring now to FIG. 4A, an example of performing initial training for the first embedding partition to train an encoder-decoder engine is illustrated. In particular, as illustrated in FIG. 4A, the system generates a first masked embedding based on processing the training input in accordance with current parameter values of the encoder 110. The first masked embedding includes encoder-generated values for the first embedding partition 106A and masked out values for the rest of the embedding partitions.

The system generates a training output (306) based on processing the generated first masked embedding using a decoder replica corresponding to the first embedding partition in accordance with current parameter values.

The system computes an objective function (308) with respect to the generated training output. An objective function evaluates the quality of the generated training output, i.e., by measuring an error between the generated training output and the target output. In general, the system uses an objective function that is well-suited to the machine learning task the neural network is being trained to perform. For example, the L2 loss function which computes a least square error between the two outputs, is a common choice of objective functions in regression machine learning tasks that involve, e.g., images and speech data.

The system determines a gradient of the objective function (310). For example, as illustrated in FIG. 4A, the system determines gradient 142 of the objective function computed with respect to the training output generated by decoder replica 120.

The system backpropagates the gradient from the decoder replica only to a corresponding portion of the encoder that generates the first embedding partition (312). For example, as illustrated in FIG. 4A, the system backpropagates the gradient from the decoder replica 120 only to a corresponding portion of the encoder 110 that generates the first embedding partition 106A.

In general, the gradient of the objective function propagates backwards from the decoder layers to the embedding, and to the encoder layers. Therefore, because the embedding only includes encoder-generated values in the first embedding partition, the gradient backpropagated from the embedding to the encoder layers only passes to a corresponding portion of the encoder (i.e., a subset of encoder parameters or a fraction of encoder parameter values) that generates values in the first embedding partition.

The system updates, e.g., based on the backpropagated gradient, respective parameter values of the decoder replica and the corresponding portion of the encoder (314). In particular, the system can use any appropriate machine learning training techniques to update the parameter value. Examples of training techniques include stochastic gradient descent, Adam, and rms-prop.

By repeatedly performing the process 300, the system trains the encoder to generate the first embedding partition in the sequence that represents the same corresponding feature of all training outputs that are generated based on a same type of training inputs. Typically, the feature corresponds to a primary feature of the training outputs.

Figure 3B:
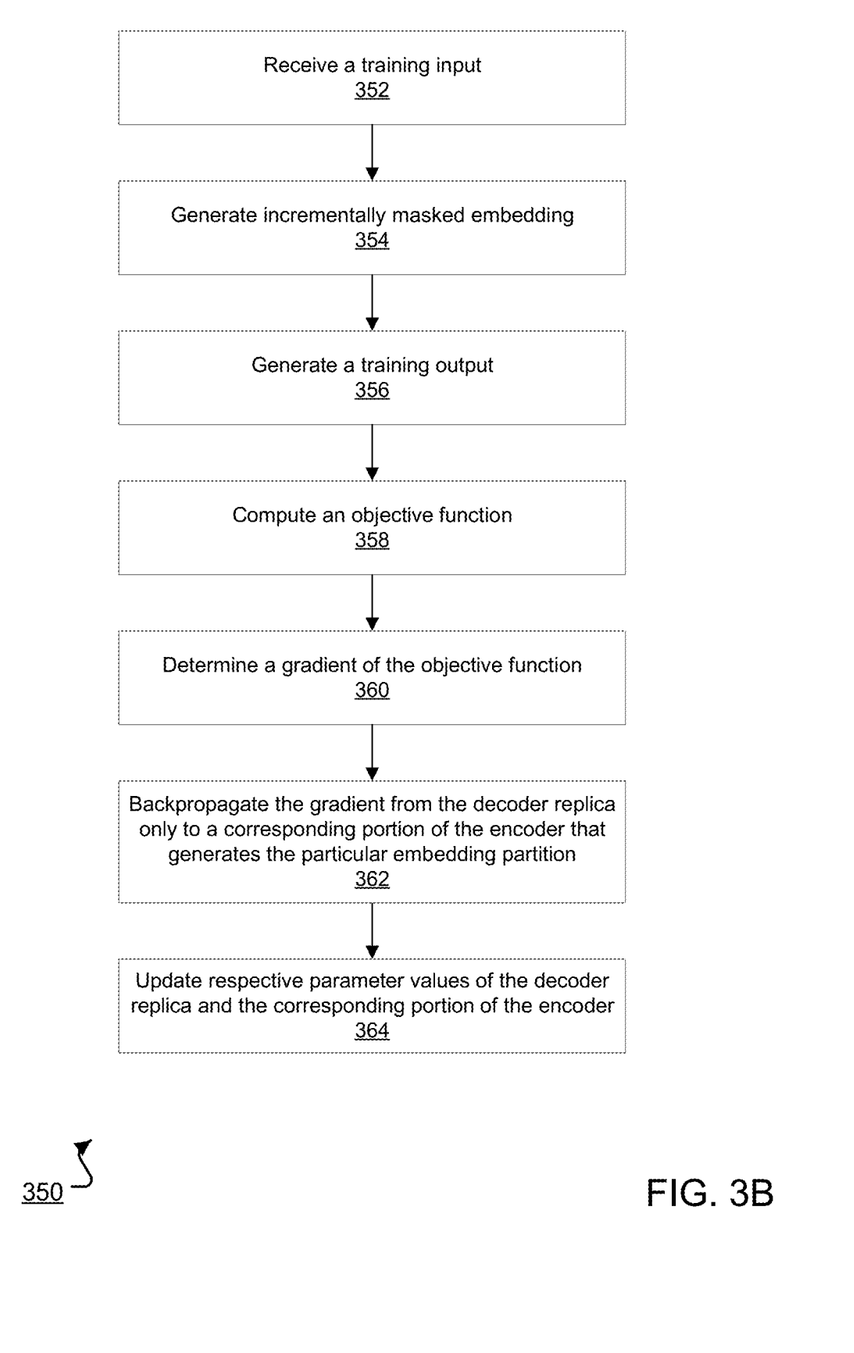
FIG. 3B is a flow diagram of an example process for performing incremental training to train an encoder-decoder engine.

FIG. 3B is a flow diagram of an example process 350 for performing incremental training to train an encoder-decoder engine. For convenience, the process 300B will be described as being performed by a system of one or more computers located in one or more locations. For example, an encoder-decoder system, e.g., the encoder-decoder system 100 of FIG. 1, appropriately programmed in accordance with this specification, can perform the process 350.

The system can repeatedly perform the process 350 for different training inputs in order to perform the incremental training, i.e., the training for each particular embedding partition that is after the first embedding partition in the sequence of embedding partitions.

The system receives a training input (352) that is associated with a target output. The target output is the output that should be generated by the system by performing the machine learning task that the system is configured to perform on the training input.

The system generates an incrementally masked embedding for a particular embedding partition (354) based on processing the training example in accordance with current parameter values of the encoder. Specifically, the incrementally masked embedding for the particular partition includes (i) values generated by the encoder for the particular embedding partition and each embedding partition that precedes the particular embedding partition in the sequence, and (ii) masked out values for any subsequent embedding partitions that are after the particular embedding partition in the sequence.

Figure 4B:
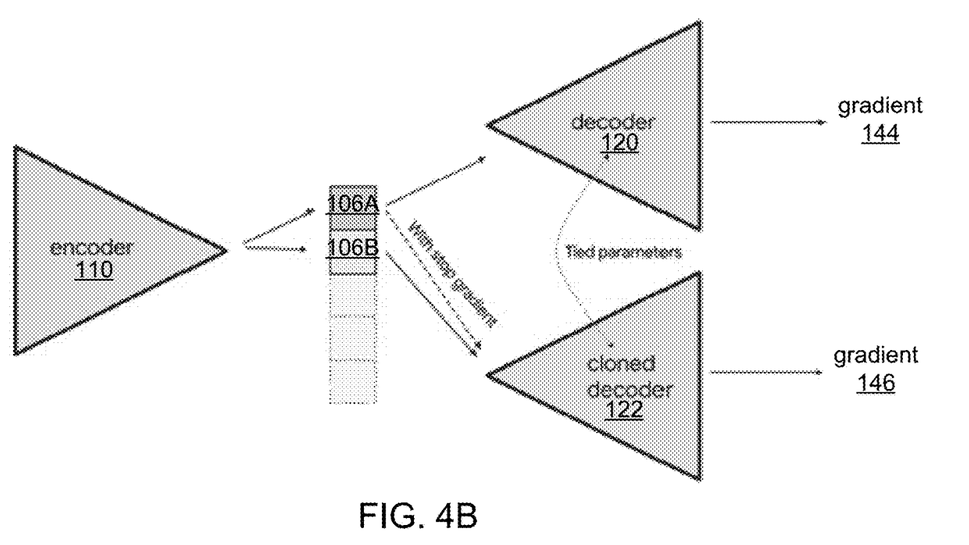
FIG. 4B is an illustration of an example of performing incremental training for the second embedding partition to train an encoder-decoder engine.

Referring now to FIG. 4B, an example of performing incremental training for the second embedding partition to train an encoder-decoder engine is illustrated. In particular, as illustrated in FIG. 4B, the system generates an incrementally masked embedding for the second embedding partition 106B based on processing the training input in accordance with current parameter values of the encoder 110. The incrementally masked embedding includes encoder-generated values in the first and second embedding partitions 106A-B and masked out values for all of the other partitions.

The system generates a training output (356) based on processing the incrementally masked embedding for the particular embedding partition using a decoder replica corresponding to the particular embedding partition in accordance with current parameter values.

The system computes an objective function (358) with respect to the generated training output.

The system determines a gradient of the objective function (360) computed with respect to the generated training output. For example, as illustrated in FIG. 4B, the system determines gradient 146 of the objective function computed with respect to the training output generated by decoder replica 122.

The system backpropagates the gradient from the decoder replica only to a corresponding portion of the encoder that generates the particular embedding partition (362). That is, the system propagates the gradient backwards from the decoder replica only to a corresponding particular embedding partition. The system then propagates the gradient backwards from the particular embedding partition to a corresponding portion of the encoder that generates the particular embedding partition.

For example, as illustrated in FIG. 4B, the system backpropagates the gradient 146 from the decoder replica 122, through the second embedding partition 106B, and only to a corresponding portion of the encoder 110 that generates the second embedding partition 106B.

The system updates, e.g., based on the backpropagated gradients, respective parameter values of the decoder replica and the corresponding portion of the encoder (364).

In some implementations, during each process 350, in addition to training a particular embedding partition, the system also trains all preceding embedding partitions in the sequence. That is, when performing process 350, the system performs the steps below jointly with corresponding steps that are described above.

Specifically, the system also generates a corresponding incrementally masked embedding for each of the one or more preceding embedding partitions that precede the particular embedding partition in the sequence (354). The incrementally masked embedding for each preceding embedding partition includes (i) values generated by the encoder for the preceding embedding partition and each embedding partition that precedes the preceding embedding partition in the sequence, and (ii) masked out values for any subsequent embedding partitions that are after the preceding embedding partition in the sequence.

For example, as illustrated in FIG. 4B, the system also generates an incrementally masked embedding for the first embedding partition 106A which precedes the second embedding partition 106B in the sequence of partitions. The first embedding partition 106A includes encoder-generated values only in the first embedding partition 106A.

The system generates one or more additional training outputs (356) using corresponding decoder replicas based on processing the one or more incrementally masked embeddings for each of the one or more preceding embedding partitions that precede the particular embedding partition.

The system computes respective objective functions (358) with respect to each of the one or more additional training outputs. Each objective function measures a corresponding error between a generated training output and the target output.

The system determines respective gradients (360) of the one or more objective functions computed with respect to the additional training outputs. For example, as illustrated in FIG. 4B, the system computes an objective function with respect to the training output generated by decoder replica 120.

The system backpropagates the gradients from respective decoder replicas only to corresponding portions of the encoder that generate each preceding embedding partition (362). For example, as illustrated in FIG. 4B, the system backpropagates the gradient 144 from the decoder replica 120, through the first embedding partition 106A, and only to a corresponding portion of the encoder 110 that generates the first embedding partition 106A.

The system updates, e.g., based on the backpropagated gradients, respective parameter values of the decoder replicas and the corresponding portion of the encoder (364).

By repeatedly performing the process 350, the system trains the encoder to generate subsequent embedding partitions in the sequence that each represent a same corresponding feature of all training outputs that are generated based on a same type of training inputs. In general, each embedding partition corresponds to a different feature from all other partitions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by data processing hardware that causes the data processing hardware to perform operations for training a machine learning model comprising an encoder and a decoder, the operations comprising:

training, using a masked embedding, the encoder and a particular decoder replica of a plurality of decoder replicas of the decoder based on a particular embedding partition of a sequence of embedding partitions, each decoder replica of the plurality of decoder replicas having one or more parameter values set equal to one or more parameter values of the decoder, each embedding partition of the sequence of embedding partitions corresponding to a respective decoder replica of the plurality of decoder replicas, each embedding partition of the sequence of embedding partitions representing one or more dimensions of an embedding, the embedding generated by the encoder from inputs and processed by the decoder to generate outputs, the masked embedding comprising:

values generated by the encoder for the particular embedding partition;

values generated by the encoder for any embedding partitions that precede the particular embedding partition in the sequence of embedding partitions; and masked out values for any embedding partitions that are subsequent to the particular embedding partition in the sequence of embedding partitions; and synchronously applying any changes made to one or more parameter values of the particular decoder replica to the decoder replicas corresponding to any embedding partitions that precede the particular embedding partition in the sequence of embedding partitions, such that the one or more parameter values of the particular decoder replica and the corresponding one or more parameter values of the corresponding decoder replicas are constrained to have the same values.

2. The computer-implemented method of claim 1, wherein the operations further comprise, for each particular preceding embedding partition that precedes the particular embedding partition in the sequence of embedding partitions, training the encoder and the decoder replica of the plurality of decoder replicas corresponding to the particular preceding embedding partition based on an incrementally masked embedding for the particular preceding embedding partition, the incrementally masked embedding comprising:

values generated by the encoder for the particular preceding embedding partition;

values generated by the encoder for any embedding partitions that precede the particular preceding embedding partition in the sequence of embedding partitions; and masked out values for any embedding partitions that are subsequent to the particular preceding embedding partition in the sequence of embedding partitions.

3. The computer-implemented method of claim 1, wherein:

the particular decoder replica corresponds to the first embedding partition of the sequence of embedding partitions; and the operations further comprise, sequentially, for each embedding partition of the sequence of embedding partitions, training the corresponding decoder replica of the plurality of decoder replicas and the encoder.

4. The computer-implemented method of claim 1, wherein the operations further comprise:

discontinuing training of the particular decoder replica; and initiating training of the decoder replica corresponding to the embedding partition subsequent to the particular embedding partition in the sequence of embedding partitions.

5. The computer-implemented method of claim 1, wherein training the encoder and the particular decoder replica comprises:

determining a gradient of an objective function with respect to an output generated by the particular decoder corresponding to the particular embedding partition;

backpropagating the gradient from the particular decoder replica to only a corresponding portion of the encoder that generates the particular embedding partition corresponding to the particular decoder replica; and updating, using the backpropagated gradient, respective parameter values of the particular decoder replica corresponding to the particular embedding partition and the corresponding portion of the encoder.

6. The computer-implemented method of claim 5, wherein the operations further comprise:

determining that the gradient of the objective function has converged to a predetermined value; and in response to determining that the gradient of the objective function has converged to the predetermined value:

discontinuing training of the particular decoder replica; and initiating training of the decoder replica corresponding to the embedding partition subsequent to the particular embedding partition in the sequence of embedding partitions.

7. The computer-implemented method of claim 1, wherein the masked out values for any subsequent embedding partitions in the sequence of embedding partitions are zero.

8. The computer-implemented method of claim 1, wherein the encoder applies an activation function having a fixed output range to an intermediate encoder output to generate embeddings.

9. The computer-implemented method of claim 1, wherein:

the inputs comprise units of text; and the outputs comprise synthesized pronunciations of units of text.

10. The computer-implemented method of claim 1, wherein the operations further comprise, after training each of the decoder replicas:

receiving a new input;

generating, by processing the new input, using the trained encoder, an initial embedding for the new input;

receiving a user input modifying one or more values of a given embedding partition of the initial embedding;

generating, based on the user input, a new embedding; and processing, using the trained decoder, the new embedding to generate an output for the new input.

11. A system comprising:

data processing hardware; and memory hardware in communication with the data processing hardware, the memory hardware storing instructions that when executed on the data processing hardware cause the data processing hardware to perform operations for training a machine learning model comprising an encoder and a decoder, the operations comprising:

training, using a masked embedding, the encoder and a particular decoder replica of a plurality of decoder replicas of the decoder based on a particular embedding partition of a sequence of embedding partitions, each decoder replica of the plurality of decoder replicas having one or more parameter values set equal to one or more parameter values of the decoder, each embedding partition of the sequence of embedding partitions corresponding to a respective decoder replica of the plurality of decoder replicas, each embedding partition of the sequence of embedding partitions representing one or more dimensions of an embedding, the embedding generated by the encoder from inputs and processed by the decoder to generate outputs, the masked embedding comprising:

values generated by the encoder for the particular embedding partition;

values generated by the encoder for any embedding partitions that precede the particular embedding partition in the sequence of embedding partitions; and masked out values for any embedding partitions that are subsequent to the particular embedding partition in the sequence of embedding partitions; and synchronously applying any changes made to one or more parameter values of the particular decoder replica to the decoder replicas corresponding to any embedding partitions that precede the particular embedding partition in the sequence of embedding partitions, such that the one or more parameter values of the particular decoder replica and the corresponding one or more parameter values of the corresponding decoder replicas are constrained to have the same values.

12. The system of claim 11, wherein the operations further comprise, for each particular preceding embedding partition that precedes the particular embedding partition in the sequence of embedding partitions, training the encoder and the decoder replica of the plurality of decoder replicas corresponding to the particular preceding embedding partition based on an incrementally masked embedding for the particular preceding embedding partition, the incrementally masked embedding comprising:

values generated by the encoder for the particular preceding embedding partition;

values generated by the encoder for any embedding partitions that precede the particular preceding embedding partition in the sequence of embedding partitions; and masked out values for any embedding partitions that are subsequent to the particular preceding embedding partition in the sequence of embedding partitions.

13. The system of claim 11, wherein:
the particular decoder replica corresponds to the first embedding partition of the sequence of embedding partitions; and
the operations further comprise, sequentially, for each embedding partition of the sequence of embedding partitions, training the corresponding decoder replica of the plurality of decoder replicas and the encoder.

14. The system of claim 11, wherein the operations further comprise:
discontinuing training of the particular decoder replica; and
initiating training of the decoder replica corresponding to the embedding partition subsequent to the particular embedding partition in the sequence of embedding partitions.

15. The system of claim 11, wherein training the encoder and the particular decoder replica comprises:
determining a gradient of an objective function with respect to an output generated by the particular decoder corresponding to the particular embedding partition;
backpropagating the gradient from the particular decoder replica to only a corresponding portion of the encoder that generates the particular embedding partition corresponding to the particular decoder replica; and
updating, using the backpropagated gradient, respective parameter values of the particular decoder replica corresponding to the particular embedding partition and the corresponding portion of the encoder.

16. The system of claim 15, wherein the operations further comprise:
determining that the gradient of the objective function has converged to a predetermined value; and
in response to determining that the gradient of the objective function has converged to the predetermined value:
discontinuing training of the particular decoder replica; and
initiating training of the decoder replica corresponding to the embedding partition subsequent to the particular embedding partition in the sequence of embedding partitions.

17. The system of claim 11, wherein the masked out values for any subsequent embedding partitions in the sequence of embedding partitions are zero.

18. The system of claim 11, wherein the encoder applies an activation function having a fixed output range to an intermediate encoder output to generate embeddings.

19. The system of claim 11, wherein:
the inputs comprise units of text; and
the outputs comprise synthesized pronunciations of units of text.

20. The system of claim 11, wherein the operations further comprise, after training each of the decoder replicas:
receiving a new input;
generating, by processing the new input, using the trained encoder, an initial embedding for the new input;
receiving a user input modifying one or more values of a given embedding partition of the initial embedding;
generating, based on the user input, a new embedding; and
processing, using the trained decoder, the new embedding to generate an output for the new input.

* * * * *